US005584612A

United States Patent [19]
Nolan

[11] Patent Number: 5,584,612
[45] Date of Patent: Dec. 17, 1996

[54] APPARATUS AND PROCESS FOR PNEUMATICALLY CONVEYING MATERIAL AND FOR CONTROLLING THE FEED OF SUPPLEMENTAL GAS

[75] Inventor: Phillip A. Nolan, Wyoming, Minn.

[73] Assignee: Nol-Tec Systems, Inc., Lino Lakes, Minn.

[21] Appl. No.: 333,610

[22] Filed: Nov. 2, 1994

[51] Int. Cl.[6] .................................................. B65G 53/66
[52] U.S. Cl. ................................................ 406/11; 406/95
[58] Field of Search .................................. 406/11, 12, 14, 406/93, 94, 95

[56] References Cited

U.S. PATENT DOCUMENTS

| | | | |
|---|---|---|---|
| 3,929,379 | 12/1975 | Krambrock | 302/24 |
| 4,067,622 | 1/1978 | Krambrock et al. | 302/24 |
| 4,515,503 | 5/1985 | Snowdon | 406/11 |
| 4,715,748 | 12/1987 | Krambrock | 406/11 |
| 4,861,200 | 8/1989 | Lubbehusen et al. | 406/14 |
| 4,909,676 | 3/1990 | Heep et al. | 406/14 |
| 4,955,761 | 9/1990 | Federhen et al. | 406/12 |
| 5,147,551 | 9/1992 | Averette | 216/640 |
| 5,224,802 | 7/1993 | Federhen et al. | 406/95 |
| 5,240,355 | 8/1993 | Hudalla | 406/95 |

FOREIGN PATENT DOCUMENTS

| | | | |
|---|---|---|---|
| 58-212526 | 12/1983 | Japan | 406/94 |
| 61-18635 | 1/1986 | Japan | 406/95 |
| 2085388 | 4/1982 | United Kingdom | 406/14 |

OTHER PUBLICATIONS

"Dense Phase Pneumatic Conveying" *Ger. Chem. Eng.* 6, Wolfgang Krambrock, (1983) 199–210.

*Primary Examiner*—Gary C. Hoge
*Attorney, Agent, or Firm*—Westman, Champlin & Kelly, P.A.

[57] ABSTRACT

An apparatus for pneumatically conveying powered or granular material in a tubular conveyer using air assists for material conveying. The gas is supplied to the air assists from a connecting conduit having compressed gas at high plant pressure. The air assists operate in response to a sensed back pressure created in the conveying conduit up stream from the air assist.

9 Claims, 8 Drawing Sheets

APPARATUS AND PROCESS FOR PNEUMATICALLY CONVEYING MATERIAL AND FOR CONTROLLING THE FEED OF SUPPLEMENTAL GAS

BACKGROUND OF THE INVENTION

The present invention is used to improve air assists for insuring uniform conveying of particulate or powdered material in a dense phase bulk material handling system, with minimization of the amount of energy used for maintaining adequate transporting of the powered or particulate material.

Dense phase transporter systems with regulated pressure air assists are illustrated in U.S. Pat. No. 5,240,355 owned by the assignee of this application. U.S. Pat. No. 5,240,355 discloses a dense phase conveying system with a conveying conduit or line that carries material under fluid pressure from a transport vessel to a receiver bin. At selected intervals along the conduit, nozzles are provided for introducing a flow of air under regulated pressure in transport zones to assist moving the material in each of the zones. The pressure in the assist nozzles is reduced in zones approaching the receiving bin, in order to minimize the wasted air.

In U.S. Pat. No. 5,224,802, a method of controlling the infeed of air from an auxiliary conduit of a pneumatic conveyer installation into a tubular conveyer conduit is illustrated. However, the valve arrangement used with that device, while using a type of pressure sensing at locations upstream and downstream of the air assist shown, has the possibility of a backfeed of air and particles from the conveying conduit into the valve arrangement, which can cause malfunctions of the valve and unreliable operation.

Various other methods for unblocking conveying conduits of slugs of particular material have been tried, utilizing similar air assists. For example, U.S. Pat. No. 4,909,676 illustrates another apparatus for conveying materials, which introduces additional gas at selected portions of the conveyer line when slugs or blockages occur.

U.S. Pat. No. 4,955,761 also describes a control device similar to that shown in U.S. Pat. No. 5,224,802, except that a spring return is used for a slider valve that controls the air flow. The same type of problems occur in this device, in that conduit connections to the valve can result in backfeeding materials into the control valves used.

Another drawback of the prior art devices is that they do not efficiently utilize energy for conveying.

SUMMARY OF THE INVENTION

The present invention relates to a pneumatic conveying system for dense phase conveying of granular or powered material, which has a plurality of pilot operated air assists that will provide air into a conveying conduit to assist conveying material that tends to build up or "slug" in the line. In the present invention, each air assist is turned on in response to a back pressure in the conveying conduit or line sensed at the previous (upstream) air assist. Therefore, a material slug of sufficient size and density must be present in the conveying conduit downstream from the previous air assist before enough back pressure is developed to warrant activating the next downstream air assist. This serves to turn on the air assists only when and if they are required to move a slug of material in the conveying conduit. This reduces gas (air) consumption, increases the ratio of material to gas efficiency, and increases control of the handling of the material in the conveying conduit. The clean gas in the supply gas conduit or line supplying the air assists is at a constant high pressure, which eliminates backfeed contamination of the air supply from material in the conveying conduit. The pressure in the supply gas conduit is always higher than the pressure in the conveying conduit. This also assures that clean gas is present in the supply air conduits leading to the pilot regulators that control flow to the air inlet to the conveying conduit.

As each air assist is turned on before and during the time when enough material is present in a conveying conduit to cause back pressure, a positive flow of clean gas through the pilot regulator to the air assist inlet insures that the dirty gas in the conveying conduit does not contaminate the pilot control conduits to the air assist valves during normal operation. The pilot control valves utilized to turn on the air assists also have mechanical seals further isolating the conveying conduit from the pilot lines connected to the air assist valves and the air supply conduit. This insures that there is no contamination through the pilot valve into the pilot supply line or valve seats, even if a component malfunctions.

DETAILED DESCRIPTION OF THE PREFERRED EMBODIMENTS

Figure 2:
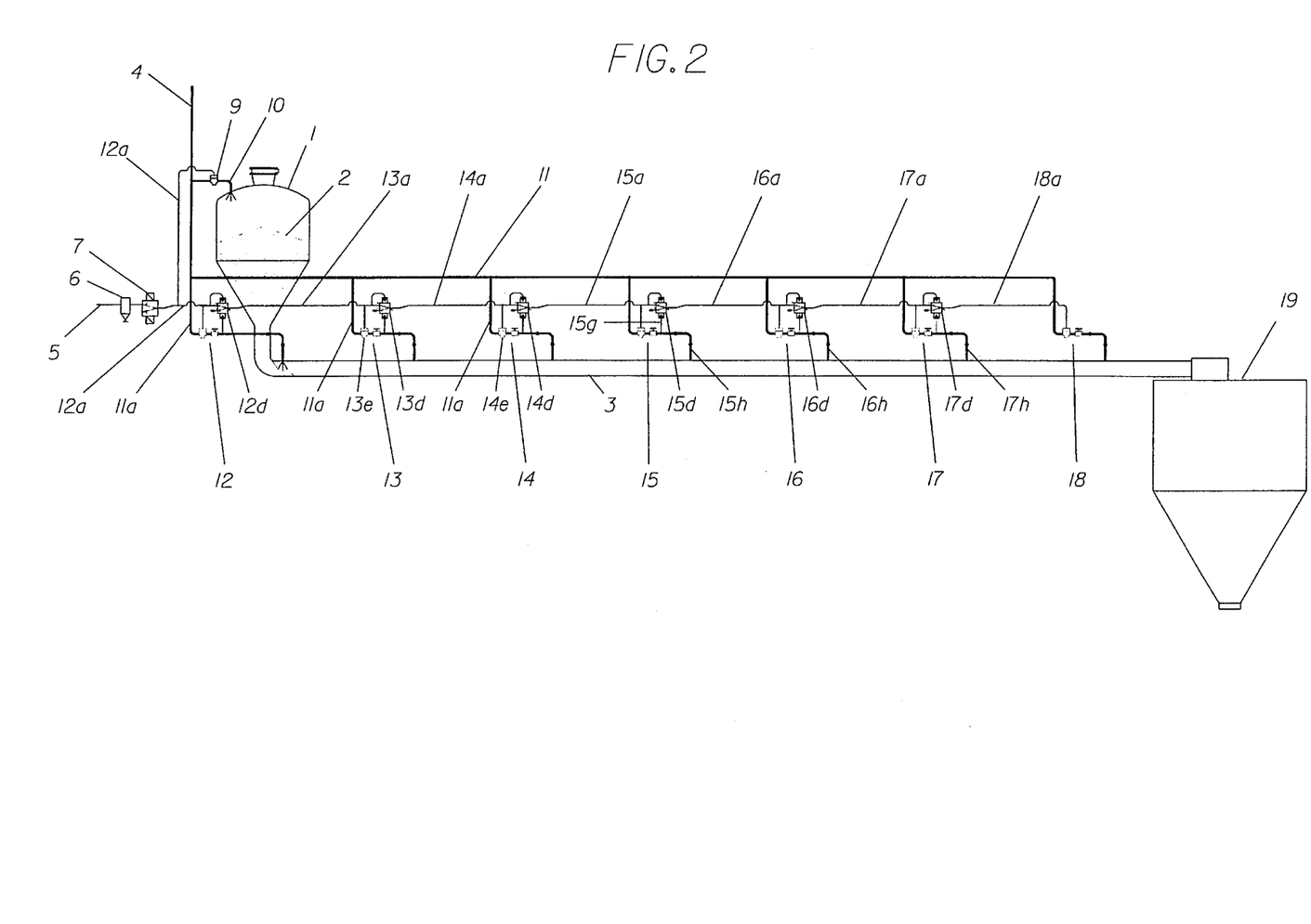
FIG. 2 is a schematic representation of a typical bulk conveying conduit utilizing the air assists controlled in accordance With the present invention using the first form of controls in a first or initial phase of a conveying cycle.

Referring first to the overall schematic showing of a dense phase pneumatic conveying system shown in FIG. 2, a transport vessel 1 holds the material to be conveyed, and has an outlet connected to a conveying conduit 3 that leads to a receiving bin 19. The transport vessel 1 is pressurized by air under pressure in an inlet line 10 leading from a pilot regulator 9. The pilot regulator 9 is activated by a pressure in a pilot line 12a leading from a transport regulator 6 through a three way valve 7.

It is to be understood that the overall arrangement of the conveying system is similar to that shown in U.S. Pat. No. 5,240,355, except that the air assists are not zoned, as will be explained, but the basic conveying arrangement is substantially the same.

With the conveying system in a static state, there is high pressure in a main (plant) air supply conduit 4 and in the pilot supply conduit 5. Pilot air pressure conduit 5 would be connected to a source of compressed air that could be the plant air source.

Conduit 12a is downstream of the transport regulator 6 and downstream of the three way supply valve 7. Valve 7 blocks flow from the transport regulator 6, and exhausts the pilot supply conduit 12a of any residual gas when it is in an off position.

Prior to starting the conveying cycle, the transport pressure regulator 6 is adjusted to provide the desired pressure in the pilot pressure lines 12a and lines connected thereto during conveying. A pilot pressure controlled regulator 9, as shown, provides a pressure in the conduit 10 as a function of the pilot pressure in line 12a. The maximum adjusted pressure from regulator 9 may not be reached under normal conveying, if flow continues smoothly. Adjustment of the transport regulator 6 will control the maximum gas pressure supplied to the vessel 1 through the regulator 9 and to the conveying conduit 3, and also to air assist assemblies shown schematically at 12, 13, 14, 15, 16, 17 and 18. The transport vessel 1 is filled with a powdered or granular (particulate) material to be conveyed, and the material inlet used for filling the vessel 1 is sealed.

In FIG. 2, the conveying system is shown at an initialization of a conveying cycle. The three way supply valve 7 opens allowing the regulated gas from the transport regulator 6 to flow into the pilot supply line 12a. Gas (air) at the predetermined pressure in the pilot supply line 12a activates the pilot regulator 9 on the top air control for the transport vessel 1, which provides air from the supply conduit 4 to the vessel 1 to pressurize the vessel through the top air inlet line 10. Simultaneously, the pressure in the pilot supply 12a opens the pilot regulator for the first air assist 12 allowing gas to flow into the conveying conduit 3. The air assist 12 is activated at the start of the conveying cycle and will remain activated until the cycle is complete.

Air assists 13–18 are controlled as a function of back pressure in the conveying conduit 3, and control of the downstream air assists differs from that of the air assist 12. Unless there is a sensed back pressure in the conveying conduit 3 downstream from the respective air assists 12–17, the air assists 13–18 are not activated and do not cause a flow of gas into the conveying conduit 3. Air assist 12 has a constant pilot pressure so it always operates during conveying.

Figure 1A:
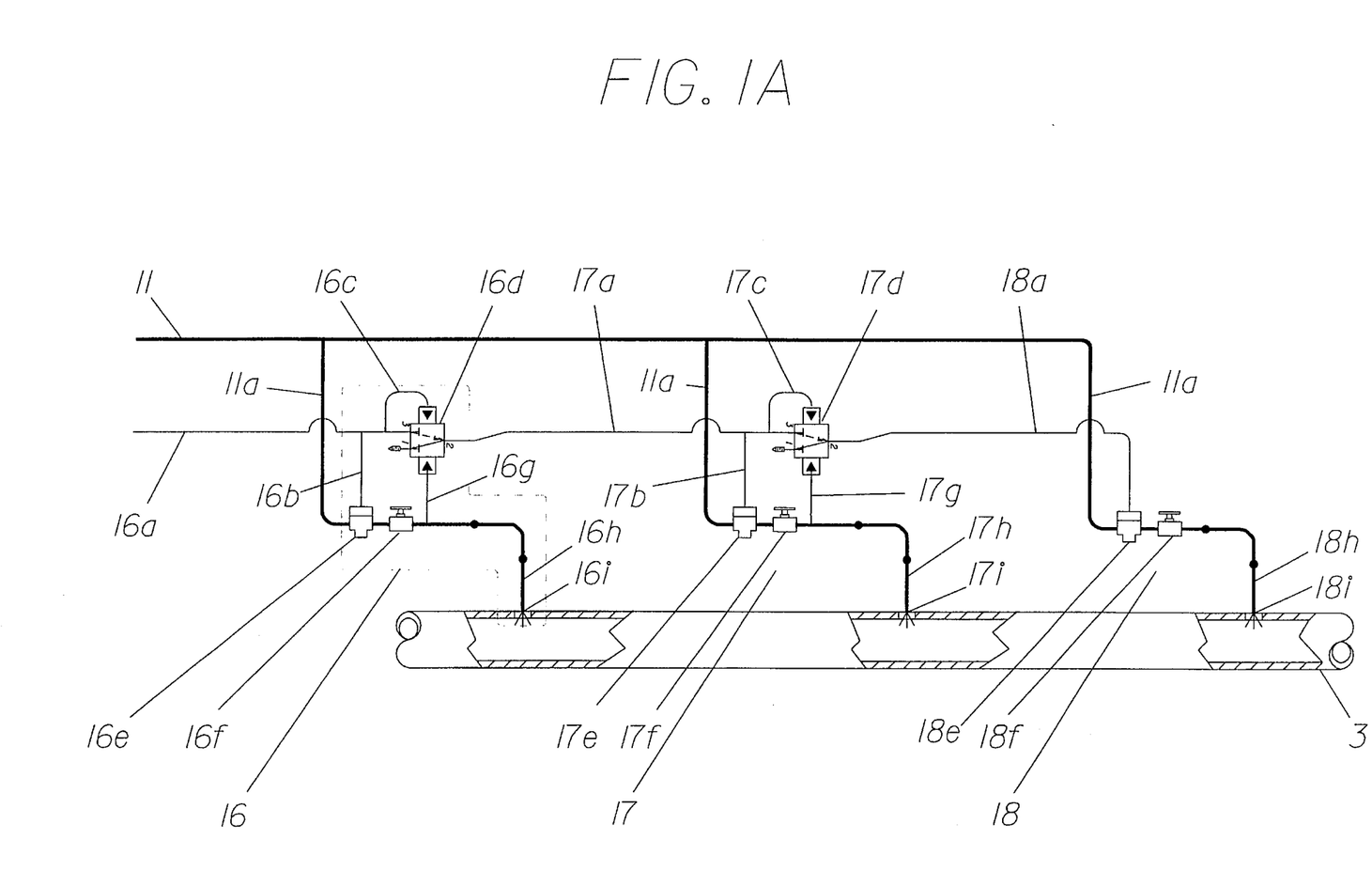
FIG. 1A is a schematic view of the section of a conveying conduit for dense phase pneumatic conveying illustrating air assists utilizing a first form of the controls of the present invention.
Figure 1B:
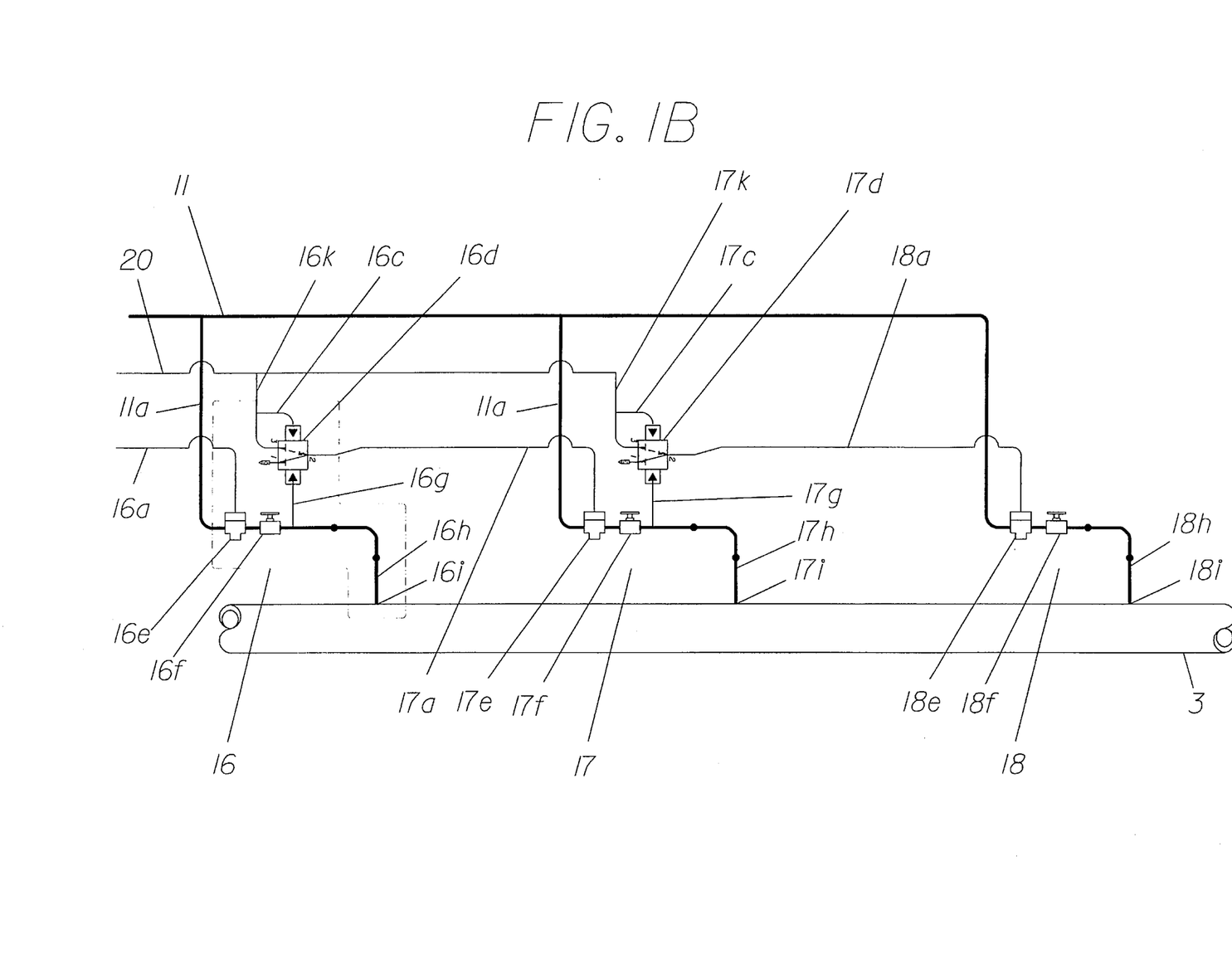
FIG. 1B is a schematic view of the air assists shown in FIG. 1A in a second form of control according to the present invention.

Typical controls for the air assists 13–18 are illustrated in FIGS. 1A and 1B. It is to be understood that only the air assists that are most closely adjacent the receiving bin 19 are illustrated in these Figures. The typical operation is the same for the air assists 13–16.

As shown in FIG. 2, a plant pressure gas (air) conduit 11 is provided, and it is connected to the conduit 4 that provides the main plant air pressure to the various components. The gas conduit 11 parallels the material conveying conduit 3. The pressure in conduit 11 is at a high pressure (i.e. 80 psi plus) and is maintained at this pressure under normal operating conditions.

Branch connections are made from the plant gas conduit 11 at each of the air assist locations, as shown schematically in FIG. 2 at 11a. Each of these branch conduits is essentially identical. The air assists 17 and 18 are being described in detail in FIG. 1A, and it can be seen that the respective conduit 11a is connected through a pilot regulator 17e and 18e, and through a throttling valve 17f and 18f to air assist conduits 16h, 17h and 18h, respectively. The conduits 17h and 18h are each connected to separate conveying conduit inlets 16i, 17i, and 18i which lead to the interior of the conveying conduit 3. They can be of any desired form known in the art.

Referring specifically to air assist 17, the pilot regulator 17e regulates the pressure of the gas exiting the regulator to be equal to the pressure present in the pilot supply line 17b. A pressure regulator made by Watts Fluidair, of Kittery, Me., USA, series R119, non-relieving, is a satisfactory regulator for the application. The high pressure in line 11a at the regulator inlet and the use of a non-relieving pressure regulator prevents flow from the conveying conduit 3 into line 17h, which insures contaminants in the conveying line are not backfeed into lines 17h or 17g.

The present invention includes connections to provide gas under pressure in pilot supply line 17a only by operation of a three way control valve 16d which is at the upstream air assist. The pressure level in pilot supply line 17a is controlled by the transport regulator 6 illustrated in FIG. 2 and previously described.

It can be seen from the schematic showing in FIG. 1A that there will be no flow through the pilot regulator 17e unless there is pressure in pilot supply line 17a, and that will not exist unless the control valve 16d is moved to its position connecting the pilot supply line 16a to the pilot supply line 17a. Assuming that there is pilot pressure in line 17a, that pressure is supplied to the input pilot side of the pilot regulator 17e through a pilot pressure line 17b, and also to the pilot side of the three way control valve 17d through a pilot pressure line 17c. Line 17a is also connected to an input port of the three way control valve 17d as shown. The pilot regulator 17e then provides gas under regulated pressure from the plant line 11a connected thereto to a throttle valve 17f that is adjusted as desired to provide a certain percentage of the flow available from pilot regulator 17e into the air assist line 17h and out through the inlet 17i, again assuming that there is pressure in pilot line 17a.

The three way control valves at each of the air assists, typically shown at 16d and 17d, are normally closed when there is pressure in the respective pilot lines at 16c and 17c. This means that pilot pressure is not permitted to pass downstream beyond the respective three way control valves, and as shown, with pressure in line 17a, the valve 17d is in a solid line position so that there is no pressure present in pilot pressure line 18a. However, the three way control valve 17d also has a sensing port on the "sense" side of the valve, so that when pressure in the sense line 17g caused by back pressure in line 17h, which is clean air, reaches a predetermined percentage of the pressure in the pilot line 17c, the valve 17d will open or move to its dotted position supplying the pilot pressure from line 17a to the pilot supply line 18a. When the pressure in the sense line 17g drops below a predetermined percentage of the pressure in the pilot line 17c, valve 17d closes and the pressure in the pilot supply line 18a is exhausted through the valve 17d, as illustrated schematically.

The pilot operated three way valves, such as that shown at 17d and utilized in the other air assists, are valves that are commercially available and which operate as a function of differential pressure at the ports connected to lines 17c and 17g. When the system is conveying material along the material conveying conduit 3, and as long as pressure is present in the pilot supply line 17a, gas under pressure will continue to pass through the air assist line 17h and into the conveying conduit 3. This gas under pressure is from the plant supply line 11 and is controlled by the pilot regulator 17e and throttle valve 17f. The air discharged through the inlet 17i will provide an air assist to insure that material in conveying conduit 3 adjacent to and downstream of the inlet 17i will be moved. As material fills the conveying conduit 3 downstream of the air assist 17, and specifically downstream of the inlet 17i, a back pressure is developed in the sensing line 17g because there will be a build up of pressure in the air assist line 17h.

When the pressure in the sensing line 17g reaches a predetermined percentage of the pressure in pilot line 17c, as was discussed, the three way valve 17d opens, allowing the pilot pressure regulated gas to travel beyond the three way control valve 17d downstream, and through the pilot supply line 18a to the succeeding pilot regulator 18e. Pilot regulator 18e is for the last air assist in the conveying conduit 3 and it provides gas under pressure from line 11 through a throttle valve 18f, through line 18h and to the air assist inlet 18i.

It will be noted that the air assist three way valve 16d will block pressure from the pilot line 17a until such time as there is a slug of material in the conveying conduit 3 between inlets 16i and 17i, that is downstream of the inlet 16i, which causes a back pressure in the air assist conduit 16h that raises the pressure in the sense line 16g leading to valve 16d to a sufficient percentage of the pressure in pilot line 16c so that the valve 16d is operated. This means that there will be no air being discharged out of the inlet 17i until there is a back pressure developed indicating that a slug is moving through the conveying conduit 3, or some other blockage condition is present.

Figure 5:
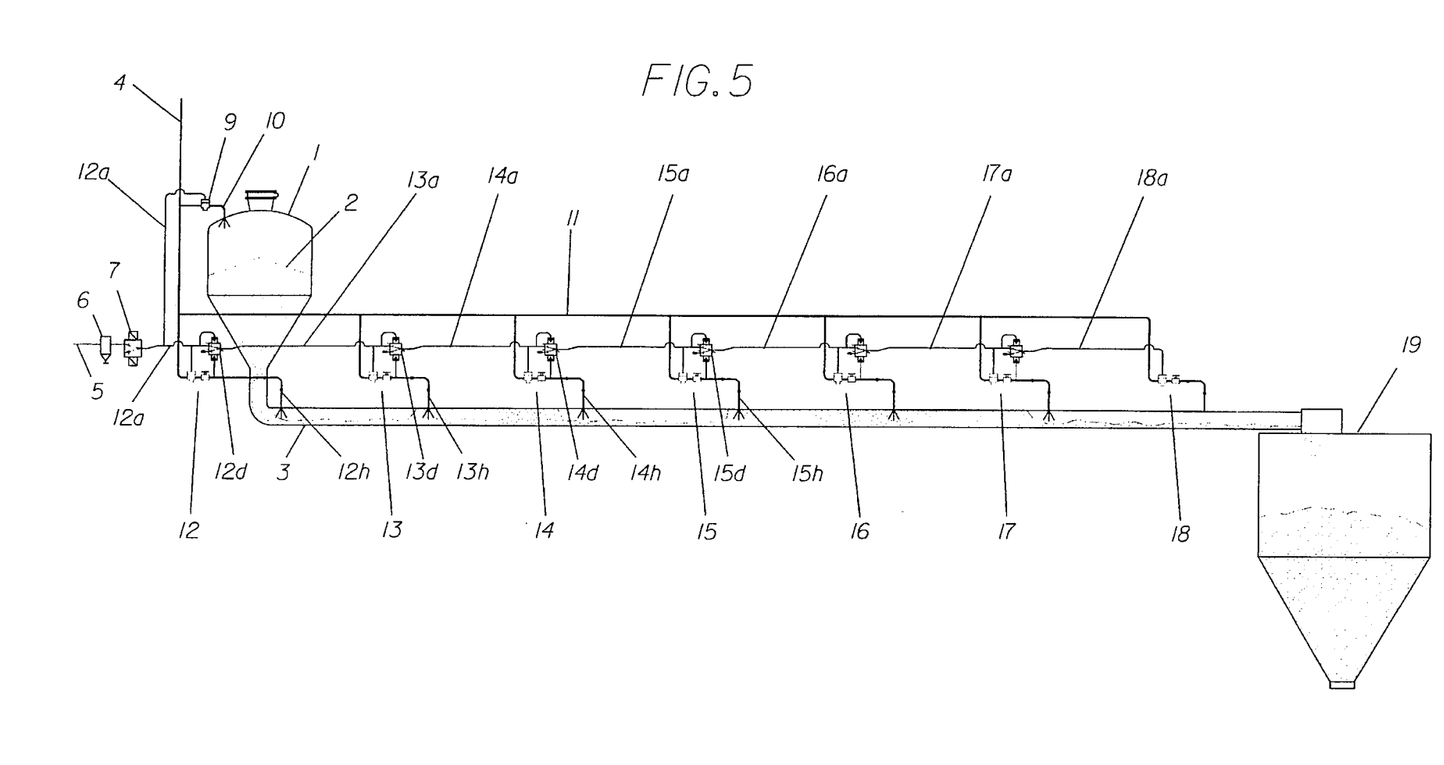
FIG. 5 is a schematic representation of a still further condition of conveying in the dease phase pneumatic conveying system of FIG. 2 where the slug closest to the receiving bin has been discharged from the conveying line and the last air assist has been turned off.

As material downstream of the air assist 17, specifically inlet 17i, is discharged from the conveying conduit, the back pressure drops in the air assist conduit 17h and thus drops in the sensing line 17g as shown in FIG. 5. When pressure in sensing line 17g drops below a predetermined percentage of the pressure in pilot line 17c, the three way valve 17d closes, stopping the flow of pilot regulated gas downstream from the three way control valve 17d and exhausting the residual gas pressure from the pilot supply line 18a.

Thus, the operation of each of the air assists is dependent upon a back pressure being developed at the next adjacent upstream air assist. The operation is identical in all of the air assists 13–18, shown in FIG. 2. The air assist 12, however, will be operating so that its inlet 12i will be discharging air, but when a blockage forms downstream of the air assist 12, the valve 12d will open to provide air into the pilot line 13a activating the air assist 13, as described in connection with the air assist 17.

In the last air assist 18, the pilot regulator 18e controls the flow and the pressure of the gas exiting the pilot regulator, which then passes through the throttling valve 18f. The throttling valve 18f controls the volume of gas exiting the throttle valve into the air assist conduit 18h.

FIG. 1B illustrates a modified control system used with the present invention and, again, schematically shows the air assists 16, 17 and 18. Pilot regulators 16e, 17e and 18e, throttling valves 16f, 17f and 18f, and pilot operated three way control valves 16d, 17d and 18d perform the same functions as previously explained. The conduits 16h, 17h and 18h also are connected to inlets within the material conveying conduit 3, as well.

In FIG. 1B, the regulated pilot pressure supply to the three way control valves 16d and 17d, as well as the control valves for the other air assists, is provided by a pilot supply line 20 connected directly from the three way supply valve 7 shown in FIG. 2. In other words, there is a direct connection from the regulated pilot pressure supply to the line 20, and this gas under pressure is then provided to each of the inlet ports for the control valves 16d and 17d, and the inlet ports of other control valves 12d–15d used in this During the conveying cycle, the pilot control pressure is continuously present in the pilot supply line 20. The pressure level is controlled by the transport regulator 6 shown in FIG. 2 and is supplied to the three way control valves 16d and 17d through pilot lines 16k and 17k, respectively. The pilot pressure is also provided to the pilot side of the three way control valve 16d and 17d through pilot lines 16c and 17c as previously explained. The presence of pressure in the pilot lines 16c and 17c holds the respective three way control valve closed, and does not allow the pilot pressure to pass beyond the three way control valves 16d and 17d.

Specifically in relation to the air assist 17, the presence of pressure in the pilot supply line 17a is again controlled by the previous air assist three way control valve 16d, and the presence of the pilot pressure in the line 16a is in turn controlled by the air assist three way control valve 15d, which is upstream from the air assist 16. Flow through the pilot regulator 17e will not exist when the valve 16d is closed, and there is no pressure in the pilot supply line 17a. However, when the pilot control pressure is present in the pilot supply line 17a, that pressure is again supplied to the pilot regulator 17e, which controls the pressure of the air discharged from regulator 17e, providing air flow through the throttle valve 17f into the air assist conduit 17h and the inlet connected thereto shown at 17i in FIG. 1B.

The three way control valve 17d operates in the same manner as described in connection with FIG. 1A. When the pressure in the sense line 17g reaches a predetermined percentage of the pressure in the pilot line 17c, which in turn is connected through line 17k to line 20, the valve 17d opens, supplying the pilot supply line 18a with pilot pressure from line 20. When the pressure in the sense line 17g drops below a predetermined percentage of the pressure in the pilot line 17c, the valve 17d closes and the pressure in the pilot supply line 18a is exhausted. Likewise, when the pressure in the sense line 16g rises to a predetermined percentage of the pressure in the pilot line 16c, then the valve 16d opens and the pilot pressure is provided to the line 17a. In this instance, the pilot air to the individual regulators 16e and 17e is connected via their corresponding upstream three way control valve from a regulated level of pressure in line 20, so that the pressure provided through the line 11a to the respective lines 16h and 17h is controlled by a uniform regulated pressure, without any series connection pressure drops.

Both forms of the control function, however, insure that the supply of gas to the pilot regulators 16e and 17e is at a high pressure that is always higher than the pressure in the conveying conduit 3 at the respective inlets, such as that shown at 17i. This insures that there will be no backfeed of particulate material from the conveying conduit 3 into the valves 16d and 17d used for control.

The start up condition for conveying was explained in connection with FIG. 2, and additional conditions are shown in FIGS. 3–7.

Figure 3:
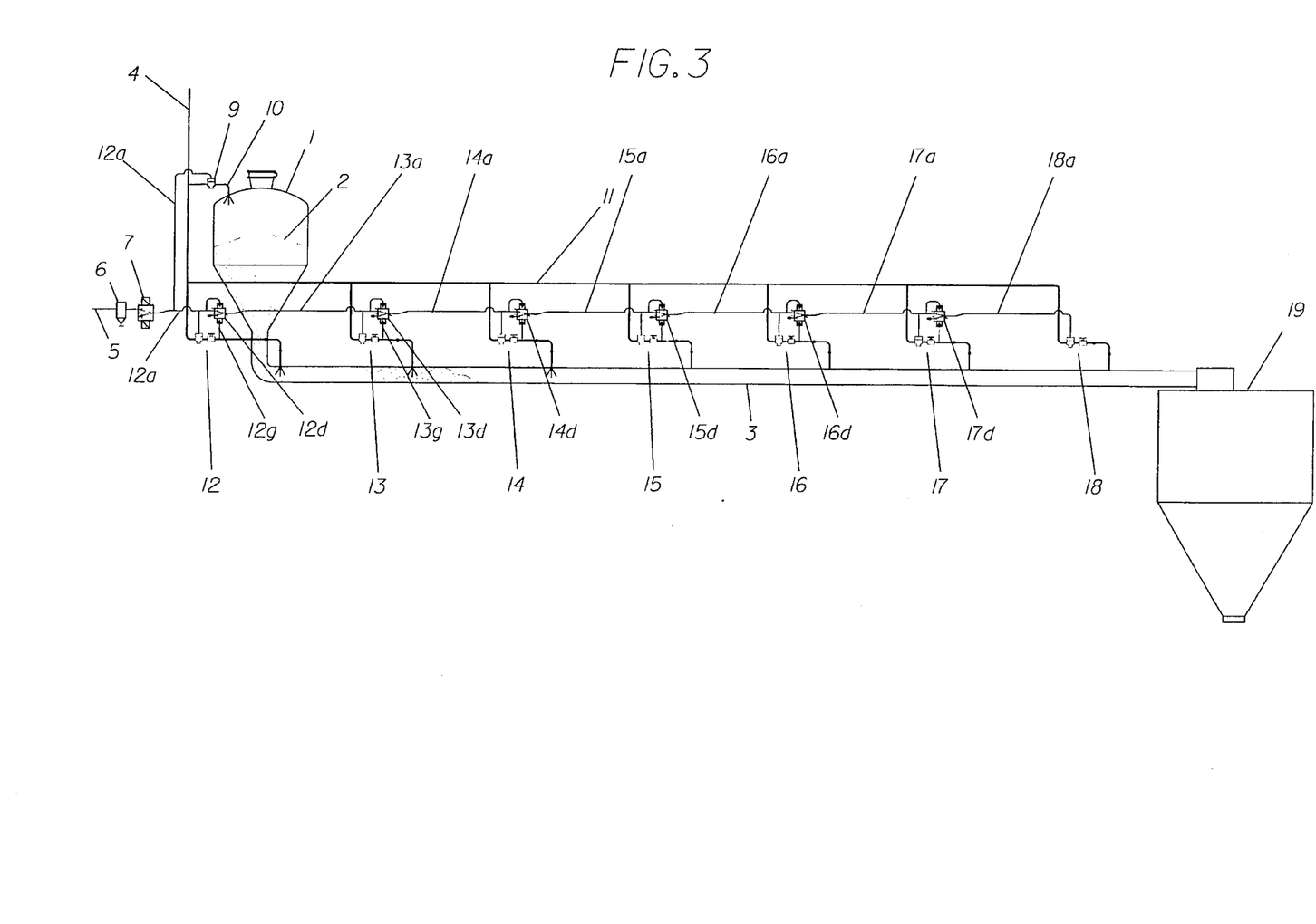
FIG. 3 is a schematic view of the dense phase conveying system of FIG. 2 in a second phase of the conveying cycle.

As pressure in the transport vessel 1 rises during start up, the material indicated at 2 flows from the transport vessel down the conveying conduit 3 as shown in FIG. 3. This is illustrated schematically, and as the material flows downstream (toward receiving bin 19) from the air assists 12 and 13, it causes enough restriction to the gas flow from the inlets used with the air assists 12 and 13 into the conveying conduit 3 to develop a back pressure which is sensed by the air assists 12 and 13, through sensing lines 12g and 13g which correspond to the sensing line 17g shown. In turn, the back pressure sensed by air assist 13 at the three way control valve 13d activates the flow of gas into the supply line 14a for assist 14, and this then provides for a flow of gas from the plant supply line 11 through the air assist regulator 14e and through the air assist inlet at air assist 14. Thus, it can be seen that the supplemental gas under pressure is added into the conveying conduit 3 at one air assist downstream of the restriction. Clean gas flows into the air assist, eliminating contamination of the air assist line, such as conduit 17h in FIG. 1A, even when back pressure is created.

Figure 4:
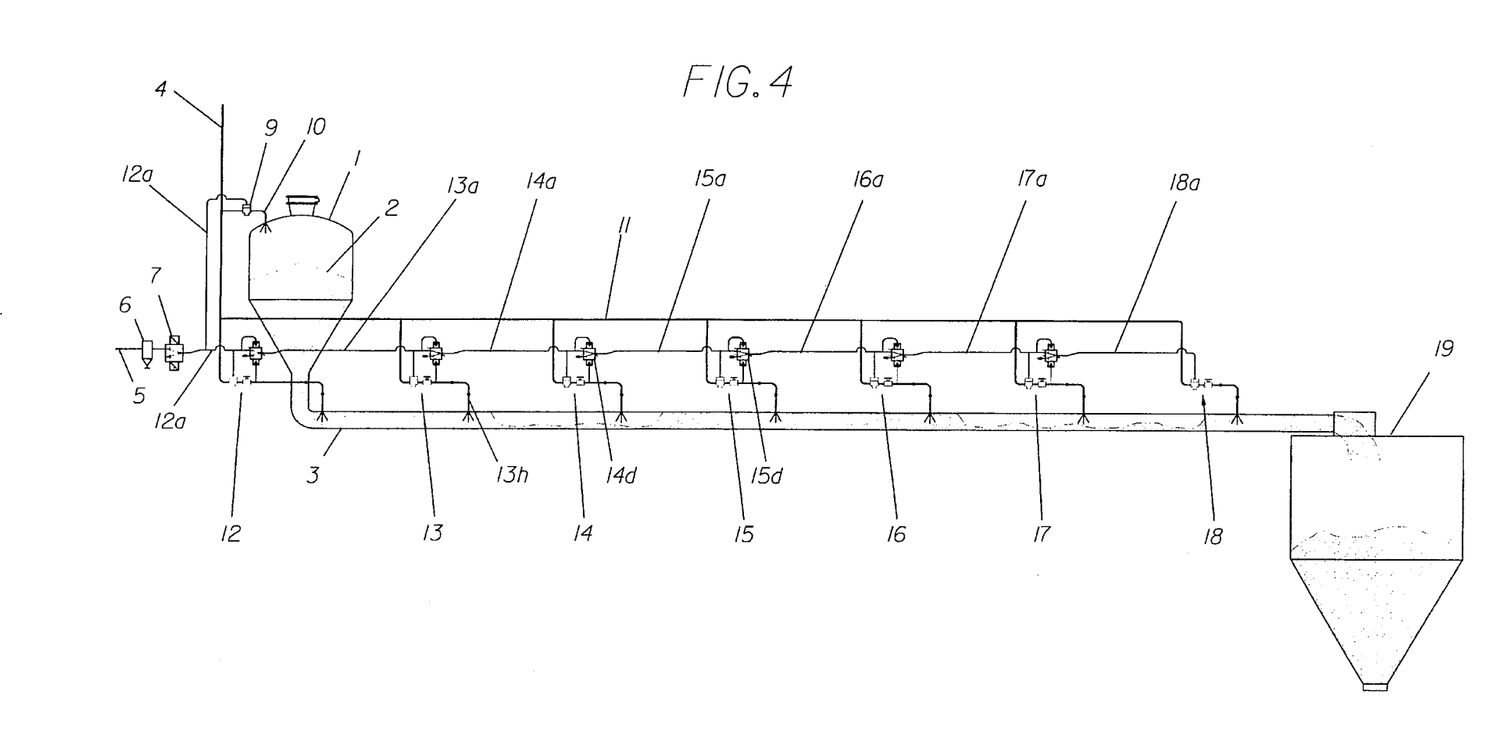
FIG. 4 is a schematic view of the dense phase pneumatic conveying system of FIG. 2 illustrating the passing of "slugs" in the conveying conduit.

Material continues to flow through the conveying conduit 3 as shown in FIG. 4, until material is flowing into the receiving bin 19. As shown in FIG. 4, material in the conveying conduit 3 may be of an adequate quantity to cause enough restriction to the gas flow from air assists 12–17 into the conveying conduit 3 to develop back pressure, which is sensed by the air assists, and if high enough, all of the air assists will be activated along the conveying conduit 3 to allow the flow of additional or supplemental gas into the conveying conduit 3.

FIG. 5 illustrates the condition where a "slug" of material has left the conveying conduit 3 and entered the receiving bin 19. This eliminated back pressure that was sensed at air assist 17. This condition is illustrated by the lower level of material downstream from the air assist inlet shown in FIG. 5 at air assist 17. The three way control valve 17d will close, blocking pilot pressure gas to pilot line 18a, and the trapped gas in the pilot line 18a is exhausted to atmosphere through three way control valve 17d. The flow of gas through the air assist 18 is stopped until the air assist 17 again senses a back pressure in the line 17g. The number of air assists that will be turned off is determined by the size and density of the slugs, and the distance between them, in the conveying conduit 3.

Figure 6:
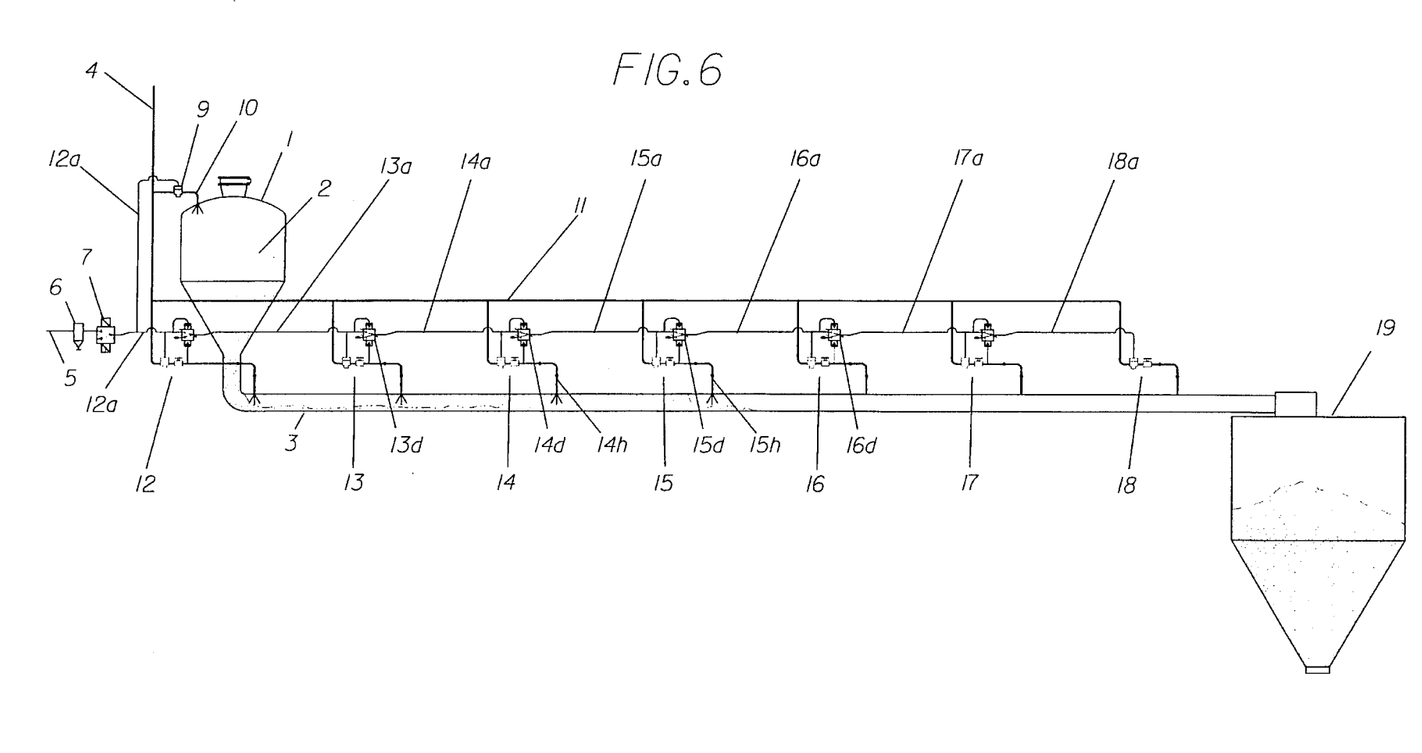
FIG. 6 is a schematic representation of a conveying system of FIG. 2 in a condition where a single slug of material is moved through the conveying conduit prior to another slug forming.

FIG. 6 illustrates a condition where the material flow through the conveying conduit 3 is so restricted that only one slug of material illustrated just at and downstream of air assist 14, is capable of moving through conveying conduit 3 at the pressure required for controlled handling. Air assist assembly 12 is activated at the start of the transport cycle, and as the material moves through the conveying conduit 3, air assists 13, 14 and 15 are activated by their respective preceding air assists, as back pressure is sensed. This will cause the slug to be moved downstream. As shown in FIG. 6, the air assists 16, 17 and 18 are turned off.

Figure 7:
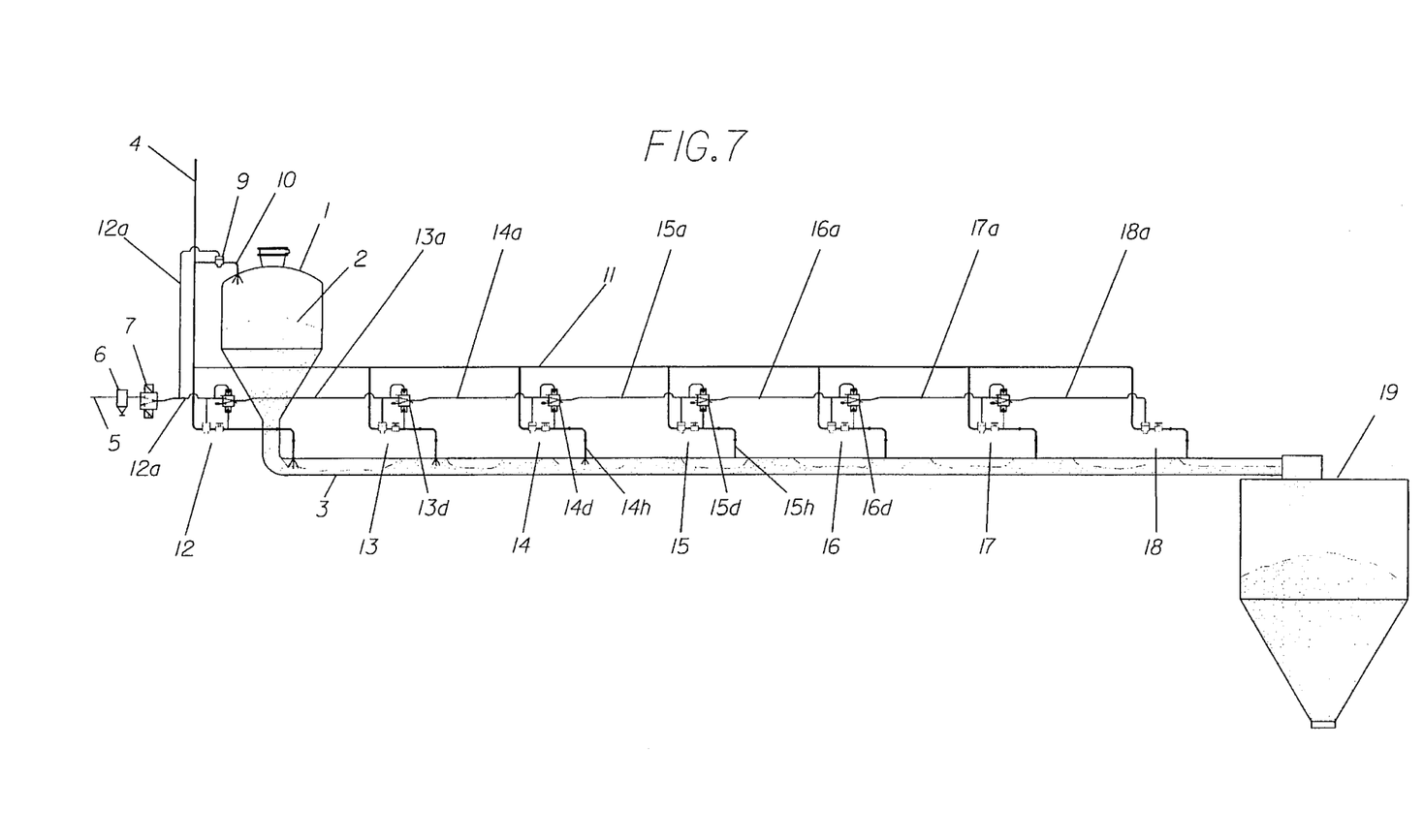
FIG. 7 is a schematic representation of the dense phase pneumatic conveying system in FIG. 2 illustrating a condition where material is flowing through the conveying conduit and back pressure does not activate all the air assist assemblies.

In FIG. 7, the conveying condition is illustrated where there is material flow that is flowing with enough ease so that many of the air assists are not required. The conveying conduit 3 is shown as being full, but not enough restriction is sensed to activate all of the air assists. In the condition shown, enough restriction generating back pressure is sensed at air assists 12 and 13 to activate the air assists 13 and 14, respectively. The remaining air assists 15–18 are deactivated until required, as sensed by back pressure developing at the upstream air assist in the conveying conduit 3.

Air assists may also be required to restart conveying after a shutdown when material is left in the conveying conduit 3.

In certain applications, air assists are not required except to start conveying once it is stopped, or only some air assists may be required near the input end of the conveying conduit 3. With the present controls, the air assists will be turned on only as needed.

To stop the transportation of material, the three way supply valve 7 is closed, stopping the flow of gas into pilot line 12a. Closing the three way supply line valve exhausts the trapped gas in the pilot line 12a and this stops the flow through the vessel 1, as well as pilot regulator 9 and the air assist 12. Flow is stopped at the remaining air assists also.

Thus, the present invention provides a way of insuring that, when needed, the air assists will be activated as determined by a sensed back pressure upstream of the respective air assists, but when not needed, the air assists will be turned off. This conserves a substantial amount of the air that is normally discharged when all air assists are continuously operated, regardless of build up of slugs or the like. Further, the present invention is very reliable because the components used for sensing are not contaminated by back feeding of dirty air from the conveying conduit into the respective valves or controls.

The three way valves 12d–17d are made so that the internal member that changes the valve position in response to the higher pressure sensed at the lines 12g–17g is sealed from the lines 12g–17g, respectively. Such a seal can be a diaphragm that deflects for operation, or a piston that slides with seals that segregate the lines 12g–17g from the internal members of the respective three way valve. While the pressure in the lines 12g–17g is from a clean air conduit, the valve construction insures that even if something goes wrong and a back flow from the conduit 3 into the lines 12g–17g occurs, the valves will not be contaminated. Pilot operated valves made by Norgren of Littleton, Colo., USA, its model 41DA00-KAI-KAA are satisfactory for use as valves.

Although the present invention has been described with reference to preferred embodiments, workers skilled in the art will recognize that changes may be made in form and detail without departing from the spirit and scope of the invention.

What is claimed is:

1. A pneumatic transport system for bulk material utilizing dense phase conveying techniques for conveying material in a pneumatic conveying line, the system comprising:

a conveying conduit;

a material transporter at an inlet end of the conveying conduit for moving material to be conveyed into the conveying conduit;

a receiver at an outlet end of the conveying conduit, with the conveying conduit being a continuous conveying conduit between the transporter and receiver; and at least two air assists along the conveying conduit, said at least two air assists each including a separate pilot operated regulator valve to discharge a supplemental amount of gas through an inlet into a predetermined location of the conveying conduit, the pilot operated regulator valve for each air assist being controlled in response to back pressure developing at an air assist located upstream from the air assist being controlled between the pilot operated regulator for the upstream air assist and the inlet connected thereto.

2. The pneumatic transport system of claim 1 and a separate pilot operated on-off valve for controlling pilot pressure from a source to each of the respective air assists, each pilot operated on-off valve having a sense port sensing the back pressure at its associated air assist.

3. The pneumatic transport system of claim 1 including a plurality of air assists more than two spaced along the conveying conduit from the transporter toward the receiver, and a supply of high pressure gas, the pilot operated regulator valve of each air assist controlling the flow of gas at each of the air assists from the supply through an air assist line into the conveying conduit;

a separate pilot pressure supply line to each of the pilot operated regulator valves;

a pilot operated on-off valve for each of the air assists for controlling the pilot pressure supply to a downstream pilot operated regulator valve at an air assist closer to the receiver; and a port of the pilot operated on-off valve for each air assist being connected to sense back pressure at the air assist line of said air assist, with said pilot operated on-off valve opening to provide pilot pressure to the downstream air assist when the sensed back pressure at the port of said pilot operated on-off valve exceeds a preselected level.

4. The pneumatic transport system of claim 3, wherein said pilot pressure supply line comprises a line connected in series with the pilot operated on-off valve of an air assist positioned closer to the transporter.

5. The pneumatic transport system of claim 3 wherein said pilot pressure supply line comprises an independent conduit connected to a source of regulated pressure, said independent conduit being connected to inlets of each of said pilot operated on-off valves of the plurality of air assists, the sensed back pressure being compared with the pressure of the pilot pressure supply line for controlling opening and closing of each of said pilot operated on-off valves.

6. An apparatus for pneumatically conveying bulk materials comprising:

a conveying conduit for transporting bulk material from a supply at an upstream location and conveying the material in a downstream direction;

a source of gas under a pilot pressure;

a plurality of pilot operated pressure regulators each having a high pressure gas inlet and a pilot pressure port and providing high pressure gas flow to one of a plurality of air assist lines spaced along the conveying line from the supply in downstream direction when pilot pressure is present at the pilot port of the respective pilot operated pressure regulator;

a separate control valve associated with each pilot operated pressure regulator for controlling flow from the source of gas under pilot pressure to the pilot port of a downstream pilot operated pressure regulator; and a sensing port on each upstream control valve for sensing pressure in the air assist line connected to the outlet of its associated pilot operated pressure regulator to provide pilot pressure to a pilot port of a downstream control valve and the pilot port of the associated downstream pilot operated pressure regulator when the pressure at the sensing port of the upstream control valve exceeds a preselected percentage of the pressure level at a pilot port on the upstream control valve.

7. The apparatus of claim 6 wherein the pressure at the high pressure inlet for each pilot operated pressure regulator is maintained at a higher pressure than the pressure in the conveying conduit.

8. The apparatus of claim 6 wherein the flow of gas from the pilot pressure source through each control valve is independent of any flow through the conveying conduit.

9. A pneumatic transport system for bulk material utilizing dense phase conveying techniques for conveying material in a pneumatic conveying conduit comprising:

a material transporter at an inlet end of the conveying conduit for moving material to be conveyed into the conveying conduit, and a receiver at an outlet end of the conveying conduit;

a plurality of more than two air assists spaced along the conveying conduit between the transporter and the receiver;

a supply of high pressure gas;

a separate pilot operated regulator valve for each air assist controlling the flow of high pressure gas at each of the air assists from the supply through an air assist line into the conveying conduit;

a separate pilot pressure supply line connected to a source of regulated pressure and to each of the pilot operated regulator valves;

a pilot operated on-off valve for each of the air assists for controlling the pilot pressure supply to a downstream pilot operated regulator valve at an air assist closer to the receiver, the pilot pressure supply line being connected to inlets of each of said pilot operated on-off valves; and a port of the pilot operated on-off valve for each air assist being connected to sense back pressure at the air assist line of that associated air assist, the sensed back pressure being compared with the pressure of the pilot pressure supply line for controlling opening and closing of that pilot operated on-off valves, the opening of each pilot operated on-off valve providing pilot pressure to a pilot operated regulator of a different air assist closer to the receiver when the sensed back pressure at the port of the respective pilot operated on-off valve exceeds a preselected level relative to the pressure in the pilot pressure supply line.

* * * * *